3,227,730
STABILIZATION OF LACTONES
William F. Goldsmith, South Charleston, and David F. Marples, St. Albans, W. Va., assignors to Union Carbide Corporation, a corporation of New York
No Drawing. Filed May 1, 1963, Ser. No. 277,094
13 Claims. (Cl. 260—343)

The present invention is related to the stabilization of lactones. More particularly, this invention is directed to the stabilization of epsilon-caprolactones against color formation, and the build-up of acidity and peroxide content, by the addition of a stabilizing amount of certain organic compounds resulting in stabilized compositions of matter heretofore unknown. The invention is particularly concerned with the stabilization of epsilon-caprolactones using triorgano phosphites Epsilon-caprolactones of high purity have been prepared by various routes, e.g., Jour. Am. Chem. Soc. 56,455 (1934) as well as U.S. Patent No. 3,064,008 (1962). The purpose of these routes was to prepare epsilon-caprolactones of high purity in substantially monomeric form and which maintain a high degree of stability when stored for various lengths of time. That is, epsilon-caprolactones which do not readily polymerize, as shown by refractive indices measurements, on standing at room temperature, or higher. But, it was observed that even very highly purified samples of epsilon-caprolactones prepared via the above routes were not color stable during storage. The color formation of epsilon-caprolactones during storage was still a problem. There remained a need for a much more saleable epsilon-caprolactone product that could be stored for prolonged periods of time without color formation. Low-colored epsilon-caprolactones having low acidity are required for producing polyester-diols, e.g., a polyester-diol made from caprolactone and ethylene-glycol, and subsequent polyurethanes having optimum end-use properties.

In the past, epsilon-caprolactone made by the oxidation of cyclohexanone with peracetic acid has generally had low color and low acidity when freshly distilled, but, however, during storage it gradually develops color and exhibits an increase in acidity and peroxide content. In a similar manner, freshly distilled epsilon-caprolactone yields low color polyesterdiols whereas the same epsilon-caprolactone after storage for two weeks at room temperature yields high color polyester-diols.

Because of the aforementioned difficulties, users of epsilon-caprolactones have found it necessary to redistill even very highly purified epsilon-caprolactones prior to use. Low color polyurethanes are highly desirable, particularly in the preparation of elastic fibers. Low acidity is necessary to prevent chain termination during preparation of polyester-diols. Low peroxides content is required to avoid discoloration during the preparation of polyester-diols and to avoid gelation during the preparation of the polyurethane.

Therefore, in order to overcome the aforementioned difficulties inherent in even highly purified epsilon-caprolactones, it has now been discovered that color-stable epsilon-caprolactones having low acidity and low peroxide content can be prepared by incorporation therein of a stabilizing amount of certain organic compounds. The organic compounds found most suitable for this purpose are the triorgano phosphites, although other organic compounds also may be used. Stabilized compositions of matter comprising an epsilon-caprolactone and a triorgano phosphite are the preferred forms of this invention.

In order for epsilon-caprolactones, e.g., epsilon-caprolactone, to be eminently suitable for making polyester diols and subsequent polyurethanes, the epsilon-caprolactone should have a low-color (10 Pt-Co, or less), a low acid number (0.1 maximum), a low peroxide content (10 parts per million maximum, as hydrogen peroxide), and a low water content (0.05 percent maximum). The stabilized compositions of this invention containing an epsilon-caprolactone and a stabilizing amount of a triorgano phosphite are in turn very suitable for making low color, low acid and low peroxide containing polyester-diols and subsequent polyurethanes having optimum end-use properties.

Prominent among the organic compounds employed as stabilizers for epsilon-caprolactones are the triorgano phosphorus compounds. Of these, particularly good results have been obtained using the triorgano phosphites having a structure corresponding to the formula:

wherein $R^1$, $R^2$ and $R^3$ may be the same or different, and each designates an alkyl, cycloalkyl, aryl, aralkyl, or alkaryl radical preferably each containing up to about 18 carbon atoms, or slightly higher. The alkyl radicals contemplated in this respect can be either linear or branch-chained. In addition, each of the radicals designated by $R^1$, $R^2$ and $R^3$ can be substituted by hydroxy, alkoxy, aryloxy, carbalkoxy or hydrocarbon acyloxy radicals. As typical of the radicals designated by $R^1$, $R^2$ and $R^3$ there can be mentioned methyl, ethyl, propyl, isopropyl, butyl, pentyl, hexyl, heptyl, 2-ethylhexyl, octyl, isooctyl, decyl, dodecyl, hexadecyl, octadecyl, cyclopentyl, cyclohexyl, phenyl, biphenyl, naphthyl, methylphenyl, ethylphenyl, phenylethyl, phenylhexyl, hydroxyethyl, methoxyethyl, phenoxyhexyl, carbethoxyethyl, propionoxyoctyl, benz-oxyhexyl, hydroxyphenyl, methoxyphenyl, carbethoxyphenyl radicals, and the like.

Representative triorgano phosphites encompassed within this invention and suitable as stabilizers include, among others, the trialkyl phosphites such as, trimethyl phosphite, triethyl phosphite, tripropyl phosphite, triisopropyl phosphite, tributyl phosphite, triisobutyl phosphite, tripentyl phosphite, triheptyl phosphite, trihexyl phosphite, trioctyl phosphite, trinonyl phosphite, tridecyl phosphite, triisodecyl phosphite, tridodecyl phosphite, trioctadecyl phosphite, tricyclohexyl phosphite, diethyl butyl phosphite, tri-(8-hydroxyoctyl)phosphites, tri(2-ethoxyethyl)-phosphite, and the like; the triaryl phosphites such as, triphenyl phosphite, tri-1-naphthyl phosphite, tri-2-naphthyl phosphite, tri-1-anthryl phosphite; monoaryl dialkyl phosphites such as, phenyl dimethyl phosphite, phenyl diethyl phosphite, phenyl dipropyl phosphite, phenyl dibutyl phosphite, phenyl dipentyl phosphite, phenyl diheptyl phosphite, phenyl dihexyl phosphite, phenyl dioctyl phosphite, phenyl dinonyl phosphite, phenyl didecyl phosphite, phenyl triisodecyl phosphite, phenyl didodecyl phosphite, 1-naphthyl didecyl phosphite, and the like; and the diaryl monoalkyl phosphites such as, diphenyl methyl phosphite, diphenyl ethyl phosphite, diphenyl propyl phosphite, diphenyl butyl phosphite, diphenyl isobutyl phosphite, diphenyl pentyl phosphite, diphenyl heptyl phosphite, diphenyl hexyl phosphite, diphenyl octyl phosphite, diphenyl nonyl phosphite, diphenyl decyl phosphite, diphenyl isodecyl phosphite, diphenyl dodecyl phosphite, di-1-anthryl ethyl phosphite, and the like.

The most preferred single group of triorgano phosphorous compounds are the unsubstituted trialkyl phosphites and especially those containing alkyl groups of from about 4 to about 12 carbon atoms in each alkyl group. The most preferred single trialkyl phosphites are: tributyl phosphite, trioctyl phosphite and tridecyl phosphite. Of these, tridecyl phosphite is the most preferred.

Other preferred triorgano phosphites are the triaryl phosphite, triphenyl phosphite, and the aryl dialkyl phosphite, phenyl didecyl phosphite.

The invention contemplates, in various aspects, that other organic compounds, such as the tertiary-butyl hindered phenols, e.g., 2,6-di-tert-butyl-p-cresol as well as monoalkyl ethers of hydroquinone, e.g., monomethyl eher of hydroquinone, are effective stabilizers for epsilon-caprolactones, as well as mixtures of, for example, 2,6-di-tert-butyl-p-cresol and a trialkyl phosphite.

The concentration of the triorgano phosphorous compound to be incorporated in the epsilon-caprolactones in accordance with this invention can vary broadly. The preferred form of the invention consists of adding from about 20 to about 1000 parts per million of triorgano phosphite to the epsilon-caprolactone, preferably a freshly distilled epsilon-caprolactone, and mixing thoroughly. For optimum results the adding and mixing operation should be carried out in a glass container in a nitrogen atmosphere, although several containers of different constructions, that is, steel, stainless steel, and aluminum containers, may be used in place of a glass container. The atmosphere over the epsilon-caprolactone may also consist of air, natural gas (methane), or other inert vapors, although nitrogen is preferred. Somewhat higher or lower concentrations of the triorgano-phosphorous compound may also be employed effectively. Twenty parts per million, or less, of the triorgano phosphite and quantities greater than 0.1 percent may be used. Quantities larger than 20 parts per million generally impart superior and longer lasting stability but quantities greater than 0.1 percent appear to be of little additional value. In general, small amounts of the triorgano phosphites are effective for inhibiting or retarding discoloration and for maintaining low acidity and peroxide content upon storage of epsilon-caprolactones when incorporated therein.

By adding between 20 and 1000 parts per million of a triorgano phosphite, such as tridecyl phosphite, to a freshly distilled epsilon-caprolactone, excellent color stability and retardation of said formation is achieved through the practice of this invention. Furthermore, no formation of peroxides is evidenced. The epsilon-caprolactone need not be freshly distilled; however, freshly distilled products generally will have greater stability.

The triorgano phosphites used as stabilizers in this invention are, in general, well-known compounds. They can be prepared by methods disclosed in Organophosphorous Compounds, G. M. Kosolapoff, Wiley & Sons, Inc., New York (1950), at pages 184–185, and others.

The epsilon-caprolactones particularly suitable for stabilization according to this invention may be repersented by the formula:

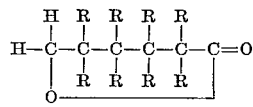

wherein R is either hydrogen or alkyl, with the proviso that when R is alkyl no more than four of the R's represent alkyl groups, the remainder being hydrogen atoms and the total number of carbon atoms in the alkyl groups does not exceed twelve.

Among the epsilon-caprolactones which can be stabilized according to this invention are: epsilon-carprolactone; alpha-methyl-epsilon-caprolactone; beta-methyl-epsilon - caprolactone; gamma-methyl-epsilon-caprolactone; delta-methyl-epsilon-caprolactone; alpha-ethyl-epsilon-caprolactone; beta-ethyl-epsilon-caprolactone; gamma - ethyl - epsilon - caprolactone; delta - ethyl -epsilon - caprolactone; alpha,beta-dimethyl-epsilon-caprolactone; alpha, gamma-dimethyl-epsilon-caprolactone; alpha,delta-dimethyl-epsilon-caprolactone; beta,gamma-dimethyl-epsilon - caprolactone; beta-delta-dimethyl-epsilon-caprolactone; gamma,delta-dimethyl-epsilon-caprolactone; beta, beta,delta-trimethyl-epsilon-caprolactone; beta,delta,delta-trimethyl-epsilon-caprolactone; alpha,beta,gamma-trimethyl-epsilon-caprolactone; alpha,beta,delta-trimethyl - epsilon-caprolactone; beta, gamma,delta,trimethyl-epsilon-caprolactone; alpha-ethyl-beta-methyl-epsilon-caprolactone; alpha - ethyl-gamma-methyl-epsilon-caprolactone; alpha-ethyl-delta-methyl-epsilon-caprolactone; beta-ethyl-alpha-methyl-epsilon-caprolactone; beta - ethyl - gamma - methyl-epsilon-caprolactone; beta-ethyl-delta-methyl-epsilon - caprolactone; gamma - ethyl-alpha-methyl-epsilon-caprolactone; gamma-ethyl-beta-methyl-epsilon-caprolactone; gamma-ethyl-delta-methylepsilon-caprolactone; delta-ethyl-alpha-methyl - epsilon - caprolactone; delta-ethyl-beta - methyl - epsilon - caprolactone; delta-ethyl-gamma-methyl - epsilon-caprolactone; alpha,alpha-dimethyl-epsilon-caprolactone; beta,beta-dimethyl-epsilon-caprolactone; gamma,gamma-dimethyl-epsilon-caprolactone; delta,delta-dimethyl-epsilon-caprolactone; alpha-alpha-delta-trimethyl-epsilon-caprolactone; beta-beta,gamma-trimethyl-epsilon-caprolactone; alpha,delta,delta-trimethyl-epsilon-caprolactone; beta,beta-dimethyl-gamma-ethyl-epsilon-caprolactone; delta,delta-dimethyl-alpha-ethyl-epsilon-caprolactone.

Other lactones known in the art may also be stabilized according to this invention, e.g., delta-valerolactone, mono- and polyalkyl substituted delta-valerolactones, zeta-enantholactone, methyl-delta-valerolactone, and the like.

Of course, mixed isomers of epsilon-caprolactones, such as mixed isomers of methyl epsilon-caprolactone also may be stabilized according to this invention.

The following examples and tables illustrate the preferred form of the invention (Example I), the effect of various types of triorgano phosphites (Examples II), the effect of various materials of construction (Example III), the stabilization of methyl epsilon-caprolactone (Example IV), and the beneficial effect on the polyester-diol made from stabilized epsilon-caprolactone (Example V).

EXAMPLE I

*Storage of epsilon-caprolactone in the presence of tridecyl phosphite*

To 100 grams of freshly distilled epsilon-caprolactone was added 0.10 gram (1000 parts per million parts) of tridecyl phosphite. The addition took place at a temperature of 25° C. in a glass container that had been previously purged with high-purity nitrogen. The freshly distilled epsilon-caprolactone contained less than 0.05 percent water, less than one part per million of peroxide (calculated as hydrogen peroxide), had a color of less than 10 Pt-Co,[1] and an acid number [2] of less than 0.10. The epsilon-caprolactone and tridecyl phosphite were mixed thoroughly.

The stability of the epsilon-caprolactone-phosphite mixture was determined by immersing a sealed pressure bottle containing 50 grams of the sample into a steam bath that was operated at a temperature of 95°±4° C. After a period of ten days, the bottle was removed and the color of the epsilon-caprolactone-phosphite mixture was determined. (Another pressure bottle containing 50 grams of the same sample of epsilon-caprolactone, but without ---
[1] ASTM Method D–1209–54.
[2] ASTM Method D–1045–58, modified in that the titration is done at a temperature not in excess of 0° C.

phosphite, was used as a blank.) The results are shown in the following table.

TABLE I

| Tridecyl Phosphite Concentration, p.p.m. | Color after 6 days at 95° C., Pt-Co |
|---|---|
| 1,190 | 10 |
| 0 (blank) | 150 |

EXAMPLE II

*Storage of epsilon-caprolactone in the presence of various triorgano phosphites*

This experiment was made to show that the stabilization of epsilon-caprolactone with phosphites is not limited to tridecyl phosphite. The epsilon-caprolactone used in this experiment was freshly distilled material having a color <10 Pt-Co. The data indicate that all of the triorgano phosphites tested were beneficial, event at concentrations as low as 20 parts per million. The tests were performed in glass pressure bottles under a nitrogen atmosphere. The results are shown in the following table.

TABLE II

| Triorgano Phosphite Added | Triorgano Phosphite Concentration, p.p.m. | Days to 50 Pt-Co at 95° C. |
|---|---|---|
| Tributyl | 1,000 | 6 |
| Do | 100 | 20 |
| Do | 20 | 23 |
| Triisobutyl | 1,000 | >4 |
| Do | 100 | >4 |
| Do | 20 | 4 |
| Trioctyl | 1,000 | 14 |
| Do | 100 | 23 |
| Do | 20 | 13 |
| Triisooctyl | 1,000 | >6 |
| Do | 100 | >6 |
| Do | 20 | 6 |
| Tridecyl | 1,000 | >32 |
| Do | 100 | 18 |
| Do | 20 | 16 |
| Phenyl didecyl | 1,000 | 14 |
| Do | 100 | 27 |
| Do | 20 | 19 |
| Diphenyl decyl | 1,000 | 6 |
| Do | 100 | >6 |
| Do | 20 | 16 |
| Triphenyl | 1,000 | >3 |
| Do | 100 | >3 |
| Do | 20 | 3 |
| None (blank) | 0 | >3 |

EXAMPLE III

*Storage of epsilon-caprolactone in the presence of various common materials of construction under both air and nitrogen atmospheres*

The following table shows the effect of adding tridecyl phosphite to epsilon-caprolactone in the presence of various common materials of construction. The tests were performed in glass pressure bottles under air and nitrogen atmospheres.

TABLE III

| Coupon, Material of Construction | Atmosphere | Tridecyl Phosphite Concentration, p.p.m. | Color, Pt-Co after 2 days at 95° C. |
|---|---|---|---|
| None (glass) | Nitrogen | 1,000 | 10 |
| Do | do | 0 | 80 |
| Steel | do | 1,000 | 10 |
| Do | do | 0 | 100 |
| 304 Stainless Steel | do | 1,000 | 100 |
| Do | do | 0 | 150 |
| Aluminum | do | 1,000 | 100 |
| Do | do | 0 | >150 |
| UCCC No. 3 | do | 1,000 | 90 |
| UCCC No. 3 | do | 0 | >150 |
| Steel | Air | 1,000 | 10 |
| Do | do | 0 | >150 |

EXAMPLE IV

*Storage of methyl epsilon-caprolactone in the presence of tridecyl phosphite*

This experiment was made to show that stabilization with triorgano phosphites is not limited to epsilon-caprolactone. Freshly distilled methyl epsilon-caprolactone was used in this experiment, which was performed in glass pressure bottles under a nitrogen atmosphere. The results are shown in the following table.

TABLE IV

| Tridecyl Phosphite Concentration, p.p.m. | Color after 3 days at 95° C., Pt-Co |
|---|---|
| 1,000 | 10 |
| 0 (blank) | 100 |

EXAMPLE V

*Color of polyester-diol made from various types of epsilon-caprolactone*

The polyester-diols are made from epsilon-caprolactone by reaction with a diol such as ethylene glycol in the presence of an esterification catalyst at an elevated temperature. The results on a typical formulation are shown below:

| Identity of epsilon-caprolactone: | Color of Polyester-diol from epsilon-caprolactone and ethylene glycol |
|---|---|
| (1) Freshly distilled material | 10 Pt-Co. |
| (2) Same as above, after storage for 13 days | About 300 Pt-Co. |
| (3) Same as 2, except 1000 p.p.m. of tridecyl phosphite was added to the freshly distilled material | 10 Pt-Co. |

As stated herein, mixtures of organic compounds such as a mixture containing 2,6-di-tert-butyl-p-cresol and a triorgano phosphite have shown to stabilize epsilon-caprolactones against discoloration. For example, a mixture of 900 parts per million tridecyl phosphite and 100 parts per million of 2,6-di-tert-butyl-p-cresol was found to stabilize epsilon-caprolactone against discoloration. In some situations, a synergistic effect has been shown by mixtures of certain phenols, e.g., 2,6-di-tert-butyl-p-cresol and a trialkyl phosphite, e.g., tridecyl phosphite.

The period of time that the epsilon-caprolactone will remain stable, when stabilized according to this invention, of course, varies with the circumstances and the conditions of storage. Epsilon-caprolactones stabilized according to this invention have remained stable for many months when stored at room temperature. Epsilon-caprolactones have remained stable for extended periods of time at temperatures from about 25° C., or lower, to about 100° C., or higher.

What is claimed is:

1. A stabilized composition of matter consisting essentially of an epsilon-caprolactone of the formula:

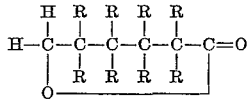

wherein R is selected from the group consisting of hydrogen and alkyl, with the proviso that when R is alkyl not more than four of the R's are alkyl, the remainder being hydrogen atoms, and the total number of carbon atoms in said alkyl does not exceed twelve, and a stabilizing amount of a triorgano phosphite of the formula:

wherein $R^1$, $R^2$ and $R^3$ are each a member selected from the group consisting of unsubstituted alkyl, cycloalkyl, aryl, aralkyl and alkaryl radicals and said radicals bearing a substituent selected from the group consisting of hydroxy, alkoxy, aryloxy, carbalkoxy and hydrocarbon acyloxy, with each of $R^1$, $R^2$ and $R^3$ containing up to about 18 carbon atoms.

2. A stabilized composition of matter consisting essentially of an epsilon-caprolactone and a stabilizing amount of a trialkyl phosphite, wherein each alkyl group is unsubstituted and contains from 1 to 18 carbon atoms, incorporated therein.

3. A stabilized composition of matter consisting essentially of an epsilon-caprolactone and a stabilizing amount of tridecyl phosphite incorporated therein.

4. A stabilized composition of matter consisting essentially of an epsilon-caprolactone and a stabilizing amount of tributyl phosphite incorporated therein.

5. A stabilized composition of matter consisting essentially of an epsilon-caprolactone and a stabilizing amount of trioctyl phosphite incorporated therein.

6. A stabilized composition of matter consisting essentially of an epsilon-caprolactone and a stabilizing amount of phenyl didecyl phosphite incorporated therein.

7. A stabilized composition of matter consisting essentially of an epsilon-caprolactone and a stabilizing amount of triisobutyl phosphite incorporated therein.

8. A stabilized composition of matter consisting essentially of an epsilon-caprolactone and a stabilizing amount of triisooctyl phosphite incorporated therein.

9. A stabilized composition of matter consisting essentially of an epsilon-caprolactone and a stabilizing amount of diphenyl decyl phosphite incorporated therein.

10. A stabilized composition of matter consisting essentially of an epsilon-caprolactone and a stabilizing amount of triphenyl phosphite incorporated therein.

11. A stabilized composition of matter consisting essentially of epsilon-caprolactone and a stabilizing amount of tridecyl phosphite incorporated therein.

12. A stabilized composition of matter consisting essentially of methyl epsilon-caprolactone and a stabilizing amount of tridecyl phosphite incorporated therein.

13. A stabilized composition of matter consisting essentially of epsilon-caprolactone and a stabilizing amount of a trialkyl phosphite, wherein each alkyl group is unsubstituted and contains from 4 to 12 carbon atoms, incorporated therein.

References Cited by the Examiner
UNITED STATES PATENTS

| | | | |
|---|---|---|---|
| 2,652,416 | 9/1953 | Coover et al. | 260—461 |
| 2,844,582 | 7/1958 | Raley | 260—332.3 |
| 3,064,008 | 11/1962 | Phillips et al. | 260—343 |

OTHER REFERENCES

Denney et al.: Jour. Amer. Chem. Soc., vol. 82 (1960), pages 1393–5.

WALTER A. MODANCE, *Primary Examiner.*

NICHOLAS S. RIZZO, *Examiner.*

UNITED STATES PATENT OFFICE
CERTIFICATE OF CORRECTION

Patent No. 3,227,730                      January 4, 1966

William F. Goldsmith et al.

It is hereby certified that error appears in the above numbered patent requiring correction and that the said Letters Patent should read as corrected below.

Column 1, line 45, for "polyesterdiols" read -- polyester-diols --; column 3, line 18, for "eher" read -- ether --; line 50, for "said" read -- acid --; line 61, for "repersented" read -- represented --; same column 3, line 75 and column 4, line 1, for "epsilon-carprolactone" read -- epsilon—caprolactone --; column 5, line 20, for "event" read -- even --.

Signed and sealed this 6th day of December 1966.

(SEAL)
Attest:

ERNEST W. SWIDER                      EDWARD J. BRENNER
Attesting Officer                        Commissioner of Patents